April 9, 1929.  L. WETMORE  1,708,644

BEARING

Filed Sept. 19, 1925  2 Sheets-Sheet 1

INVENTOR
Laurence Wetmore.
BY
ATTORNEY

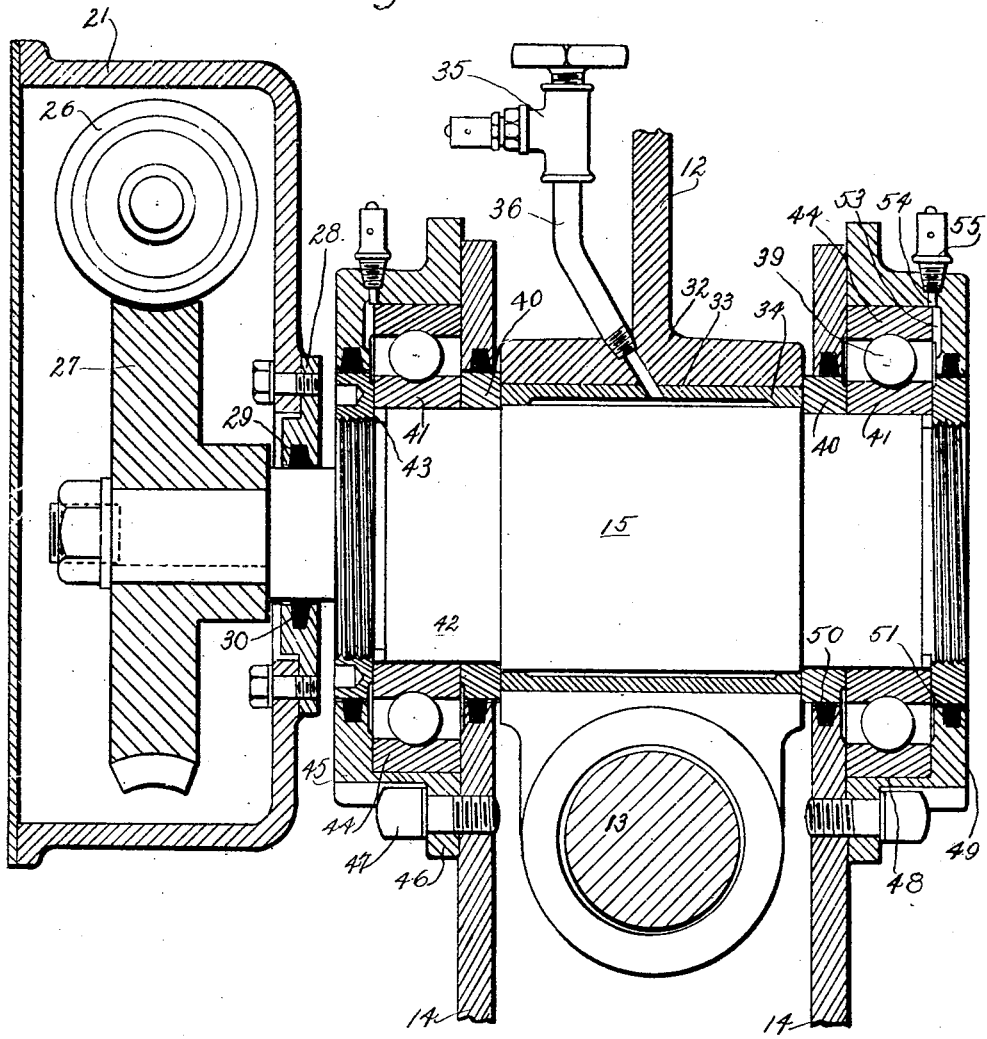

Patented Apr. 9, 1929.

1,708,644

UNITED STATES PATENT OFFICE.

LAURENCE WETMORE, OF AKRON, OHIO, ASSIGNOR TO THE GOODYEAR TIRE & RUBBER COMPANY, OF AKRON, OHIO, A CORPORATION OF OHIO.

BEARING.

Application filed September 19, 1925. Serial No. 57,408.

My invention relates to bearings and it has particular reference to a bearing assembly adapted to support a rocking or oscillating member.

The object of my invention is to provide a bearing assembly particularly adapted for use in a machine in which the supported member is subjected to an intermittent oscillatory motion, while the supporting shaft has a continuous unidirectional motion.

Figure 1:
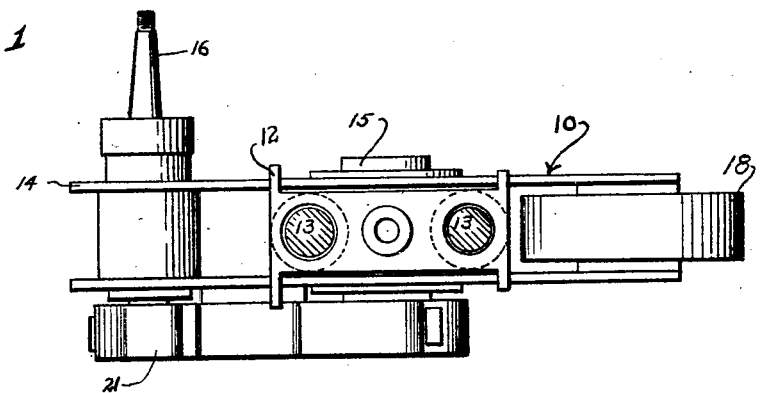
Figure 2:
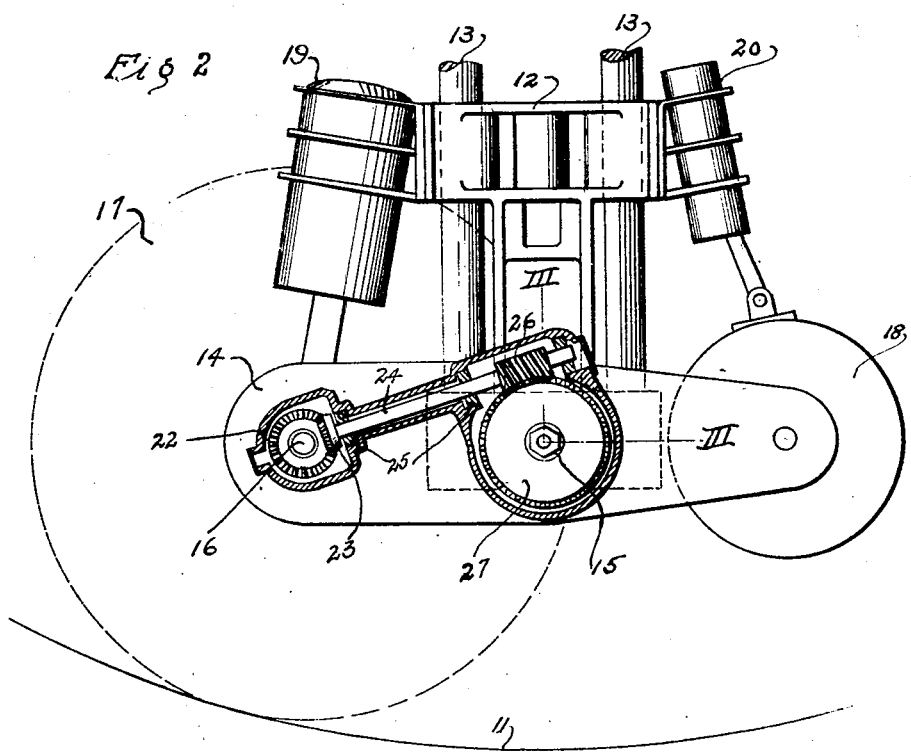

One embodiment of the principles of my invention is shown in the accompanying drawings, wherein;

Fig. 1 is a plan view of a mechanism as embodied in a tire testing machine, portions thereof being broken away for the sake of clearness, Fig. 2 is a side view partially in section and partially in elevation of the mechanism illustrated in Fig. 1; and Fig. 3 is a cross-sectional view of the rocker bearing assembly, the section being taken along the line III—III of Fig. 2.

My invention is particularly adapted to be employed upon a tire testing machine of the type described in Patent No. 1,669,622, issued May 15, 1928 to Vladimir Victor Messer, and assigned to The Goodyear Tire & Rubber Company. The invention disclosed therein, as indicated on the accompanying drawings, comprises a machine for testing rubber tires, comprising a rotor on which is mounted a plurality of tire supporting units 10 and a stator on which is mounted a plurality of test tracks 11 which are engaged by tires mounted on the units 10. Each of the units 10 comprises a supporting structure 12 adjustably mounted upon the rotor by means of two radially extending posts 13 which project thereinto. The structure 12 is provided with a tire supporting member 14, which is pivotally mounted thereon by means of a shaft 15 of relatively large diameter. The tire supporting member 14 is provided at one end with a shaft 16 adapted to support a wheel having a tire 17 to be tested, secured thereto, and on the other end is mounted a counterbalance weight member 18, having a moment equal to that of the wheel and tire 17.

Fluid actuated cylinders 19 and 20, which are secured to the supporting structure 12 and are connected to the pivotally mounted member 14 adjacent the shaft 16 and to the counterbalance weight member 18 respectively, constitute a portion of the means described in the Messer patent to cause the tire 17 to engage the track 11, or to raise it therefrom. During operation, the pressures exerted within the cylinders 19 and 20 may be varied, thus imparting to the member 14 an aperiodic oscillating motion about the shaft 15. Roughness in the track 11 and eccentric mounting of the tire may also cause the member 14 to have a vibratory or oscillatory motion.

Various types of bearing assemblies were employed to support the pivotally mounted member 14 upon the shaft 15, but in each instance it was found that the excessive friction developed had caused the races of the anti-friction bearings employed to become pitted, owing to the limited rotative movement of the member 14 and its attached race ring. These difficulties have been overcome in my present invention by providing a bearing assembly wherein the shaft 15 is caused to rotate continuously, thus imparting to the race ring secured thereto a continuous rotative movement and thereby distributing the wear throughout the entire bearing.

Positive unidirectional rotation, which may be either clockwise or counter-clockwise, is imparted to the shaft 15 by means of a suitable driving mechanism interconnected with the shaft 16, which is enclosed in a housing 21 secured to the member 14. The driving mechanism comprises a bevel gear 22, keyed to the shaft 16, which meshes with a cooperating bevel gear 23 secured to a drive shaft 24 mounted in suitable bearings 25 positioned in the housing 21. A worm 26, keyed to the opposite end of the drive shaft 24, engages with a worm gear 27, which is secured to the rocker shaft 15. As best shown in Fig. 3, closure plates 28 are secured to the housing 21, and are provided with grooves 29 adapted to receive a packing ring 30. The rings 30 surround the shafts 15 and 16 and provide a means for preventing the escape of lubricant from the housing.

The central portion 32 of the support 12 is machined to provide a housing 33 in which is positioned a bearing 34, adapted to receive the shaft 15. The bearing 34 may be of any desired type, such as a babbitt or bronze bushing, or it may consist of a suitably mounted anti-friction bearing. A grease cup 35 is connected to the bearing 34 by a conduit 36 and provides a means for lubricating the bearing.

The tire supporting member, or rocker arm, 14 is pivotally mounted upon the rotatable shaft 15 by means of anti-friction bearings 39, positioned on each side of the bushing 34 and spaced therefrom by means of collars 40. Each of the inner race rings 41 of each bearing 39 is mounted upon a portion 42 of the shaft 15, which is of smaller diameter than the central portion thereof, and is secured thereto by means of a nut 43 which engages the ring 41 and presses it against the collar. The outer race ring 44 of each bearing 39 is mounted in a housing 45 provided with a flange 46 which engages the rocker arm 14 and to which the housing is secured by any suitable means such, for example, as screws 47. The housing 45 is provided with an inner circumferential seat 48, in which the race ring 44 is secured, and with an inwardly extending circumferential flange member 49 which surrounds the nut 43. The rocker arm 14 and the flange member 49 are each provided with a groove, indicated at 50 and 51, respectively, in which is placed a suitable packing ring to prevent escape of lubricant between the collar 40 and the member 14 and the nut 43 and the flange 49, respectively.

Each of the housings 45 is provided with a radially inwardly extending channel 53 formed in the portion 49 thereof, which is in open communication with a conduit 54, to which is secured a lubricating device, such as a grease cup 55.

The oscillations of the rocker arm 14 are frequently irregular in occurrence, amplitude, and direction, but the maximum values of the quantities are relatively small. By imparting a definite unidirectional rotation to the shaft 15, there is always a positive rotation of the inner race rings 41 of the bearings 39 with respect to the outer race rings 44. The relative positions of the races and of the anti-friction elements are constantly changing, and hence the balls or rollers are not in contact with a given area of either race for a sufficient length of time to cause pitting or localized wear.

Although my bearing assembly has been described in connection with a tire testing machine, it is to be understood that such adaptation is given merely for the purposes of clearly illustrating the principles of the invention, which are obviously applicable to other types of installations. It is also apparent that structural modifications may be made without departing from the spirit of the invention, which should be limited only by the scope of the following claims.

What I claim is:

1. A bearing assembly comprising a support provided with a bearing, a shaft journalled therein, housings surrounding portions of the shaft, and mounted thereon by bearing members, and a rocking arm mounted on the housings.

2. A bearing assembly comprising a support having a central portion provided with a bearing, a shaft mounted in the bearing, housings mounted on the shaft by means of anti-friction bearings, a rocker arm secured to the housings, and means associated with the rocker arm for imparting to the shaft a positive continual unidirectional motion of rotation relative thereto.

3. A bearing assembly comprising a support provided with a bearing, a shaft journalled therein, housings surrounding portions of the shaft and mounted thereon by bearing members, a rocking arm mounted on the housings, and means associated with the rocking arm for imparting rotational movement to the shaft.

In witness whereof, I have hereunto signed my name.

LAURENCE WETMORE.